(12) United States Patent
Baldet et al.

(10) Patent No.: US 8,041,486 B2
(45) Date of Patent: Oct. 18, 2011

(54) METHOD OF GEAR-SHIFTING IN A SERVO-CONTROLLED MANUAL GEARBOX

(75) Inventors: Franck Baldet, Torre Maina (IT); Luca Poggio, Casalecchio di Reno (IT); Amedeo Visconti, Turin (IT)

(73) Assignee: Ferrari S.p.A., Modena (IT)

( * ) Notice: Subject to any disclaimer, the term of this patent is extended or adjusted under 35 U.S.C. 154(b) by 541 days.

(21) Appl. No.: 12/090,962

(22) PCT Filed: Oct. 20, 2006

(86) PCT No.: PCT/IB2006/002945
§ 371 (c)(1),
(2), (4) Date: Feb. 25, 2009

(87) PCT Pub. No.: WO2007/045986
PCT Pub. Date: Apr. 26, 2007

(65) Prior Publication Data
US 2009/0216413 A1    Aug. 27, 2009

(30) Foreign Application Priority Data
Oct. 21, 2005   (IT) .............................. BO2005A0635

(51) Int. Cl.
*G06F 19/00* (2006.01)
*F16H 61/02* (2006.01)

(52) U.S. Cl. ................. 701/54; 701/58; 701/62; 701/64; 701/66

(58) Field of Classification Search .................... 701/66, 701/64, 54, 58, 62; 477/68, 97, 115–124, 477/79, 80, 474, 175, 176, 180; 370/508, 370/519; 375/354, 356
See application file for complete search history.

(56) References Cited

U.S. PATENT DOCUMENTS

| 5,881,853 | A  | * | 3/1999  | Peuster et al. ............... 192/3.56 |
| 6,847,878 | B2 | * | 1/2005  | Cimmino et al. ............... 701/56 |
| 6,969,338 | B2 | * | 11/2005 | Dreibholz et al. ............. 477/77 |

FOREIGN PATENT DOCUMENTS

| DE | 196 35 867 | 3/1998 |
| EP | 1 201 483  | 5/2002 |
| FR | 2 431 642  | 2/1980 |
| FR | 2 793 857  | 11/2000 |
| WO | 02 057108  | 7/2002 |

* cited by examiner

*Primary Examiner* — Thomas Black
*Assistant Examiner* — Sara Lewandroski
(74) *Attorney, Agent, or Firm* — Oblon, Spivak, McClelland, Maier & Neustadt, L.L.P.

(57) ABSTRACT

A method of gear shifting in a servo-controlled gearbox. The method generates an oscillation on angular velocities of primary and secondary shafts of the gearbox, separates the primary shaft from the secondary shaft thus disengaging a first current gear when the oscillation has taken the angular velocity of the primary shaft close to the angular velocity that the primary shaft must assume to engage a second next gear, and connects the primary shaft to the secondary shaft thus engaging the second next gear when the oscillation has led the angular velocity of the secondary shaft to equalize the current angular velocity of the primary shaft multiplied by the transmission ratio of the second next gear.

24 Claims, 4 Drawing Sheets

METHOD OF GEAR-SHIFTING IN A SERVO-CONTROLLED MANUAL GEARBOX

TECHNICAL FIELD

The present invention relates to method and unit for gear-shifting in a servo-controlled gearbox.

BACKGROUND ART

There is an increasing use of servo-controlled gearboxes, which are structurally similar to manual gearboxes of the traditional type, except for the fact that the clutch pedal and the gear selection lever operated by the user are replaced by corresponding electrical or hydraulic servo-controls. When using a servo-controlled gearbox, the user only needs to send the order to shift up or down to a transmission control unit and the transmission control unit autonomously shifts by acting both on the engine and on the servo-controls associated to clutch and gearbox.

The gear shifting order may be generated either manually, i.e. following a command imparted by the driver, or automatically, i.e. regardless of the action of the driver. When the gear shifting order is generated, the transmission control unit drives the servo-control associated to the clutch to open the clutch so as to mechanically separate a primary shaft of the gearbox from a crankshaft; at the same time, the transmission control unit acts on the engine control unit to temporarily reduce the motive torque output by the engine itself.

Once the transmission control unit has checked opening of the clutch, the transmission control unit drives the servo-controls associated to the clutch to disengage the currently engaged gear; when the transmission control unit has checked gear disengagement, the transmission control unit drives the servo-controls associated to the gearbox to shift the primary shaft with respect to a secondary shaft so as to arrange engagement of the new gear. Once the transmission control unit has checked that the primary shaft has reached the required position with respect to the secondary shaft, the transmission control unit drives the servo-controls associated to the gearbox to engage the new gear.

Finally, when the transmission control unit has checked that the new gear has been engaged, the transmission control unit drives the servo-control associated to the clutch to close the clutch so as to make the primary shaft of the gearbox and the crankshaft reciprocally and angularly integral; at the same time, the transmission control unit acts on the engine control unit to restore the motive torque of the engine itself.

In normal driving conditions, the servo-controlled gearbox is required to rapidly shift gears without triggering abrupt longitudinal acceleration/deceleration on the vehicle, which are annoying for vehicle passengers and subject the vehicle transmission to unnecessary mechanical strain. In sporty driving conditions, the servo-controlled gearbox is required to shift gears as fast as possible without subjecting the transmission to excessive mechanical strain which could lead to damaging the transmission itself.

The currently marketed servo-assisted gearboxes operating according to the above-described method require a time generally from 250 to 600 ms to shift a gear; the time actually employed depends both on the dynamic performance of the gearbox components and on the required level of comfort. A 250 ms gear shift is already very fast; however, it is still relatively slow for sporty driving, especially for competitive track racing.

It is important to observe that the gear must be shifted, compatibly with requirements of comfort and mechanical protection, as rapidly as possible during gear progression, i.e. when shifting from a lower gear to a higher gear, because during gear progression the engine is 'driving' to accelerate the vehicle and consequently must be separated from the drive wheels for the shortest possible time; instead, when shifting down, i.e. when shifting from a higher gear to a lower gear, the gear shift may also be slower, because vehicle deceleration is essentially performed by the braking system and the engine does not have an essential role in vehicle dynamics.

It is known that gear shifting time is mainly determined by the new gear synchronisation time, i.e. by the time employed by the synchronisers to adapt the angular velocity of the primary shaft of the gearbox to the angular velocity determined by the new ratio.

In order to reduce the synchronisation time during gear progression, i.e. when shifting from a lower gear to a higher gear, the use of a braking device coupled to the primary shaft of the gearbox has been proposed so as to brake the primary shaft itself and rapidly adapt the angular velocity of the primary shaft to the angular velocity determined by the new ratio. However, this solution is relatively costly and complicated due to the need of arranging and controlling a brake coupled to the primary gearbox shaft.

Furthermore, as described in patent application EP1201483A2, in order to reduce the synchronisation time during gear progression, a method of disengaging gears in a servo-controlled gearbox has been proposed according to which an oscillation is generated on the angular velocity of a primary shaft of the gearbox by abruptly opening the respective clutch, and the gear is disengaged about the maximum amplitude of a first oscillation half-wave, when the oscillation itself has taken the angular velocity of the primary shaft close to the angular velocity that the primary shaft must assume to engage the next gear. However, also the method proposed by patent application EP1201483, while reducing the required shifting time, does not allow to reach the extremely short shifting times required by sporty driving.

DISCLOSURE OF THE INVENTION

It is the object of the present invention to provide a method of gear shifting in a servo-controlled gearbox, which is easy and cost-effective to implement and which, at the same time, is free from the above-described drawbacks and allows for rapid gear shifting.

According to the present invention, a method of gear shifting in a servo-controlled gearbox is provided as recited in the attached claims.

BRIEF DESCRIPTION OF THE DRAWINGS

The present invention will now be described with reference to the accompanying drawings illustrating a non-limitative embodiment example thereof, in which.

BEST MODE FOR CARRYING OUT THE INVENTION

Figure 1:
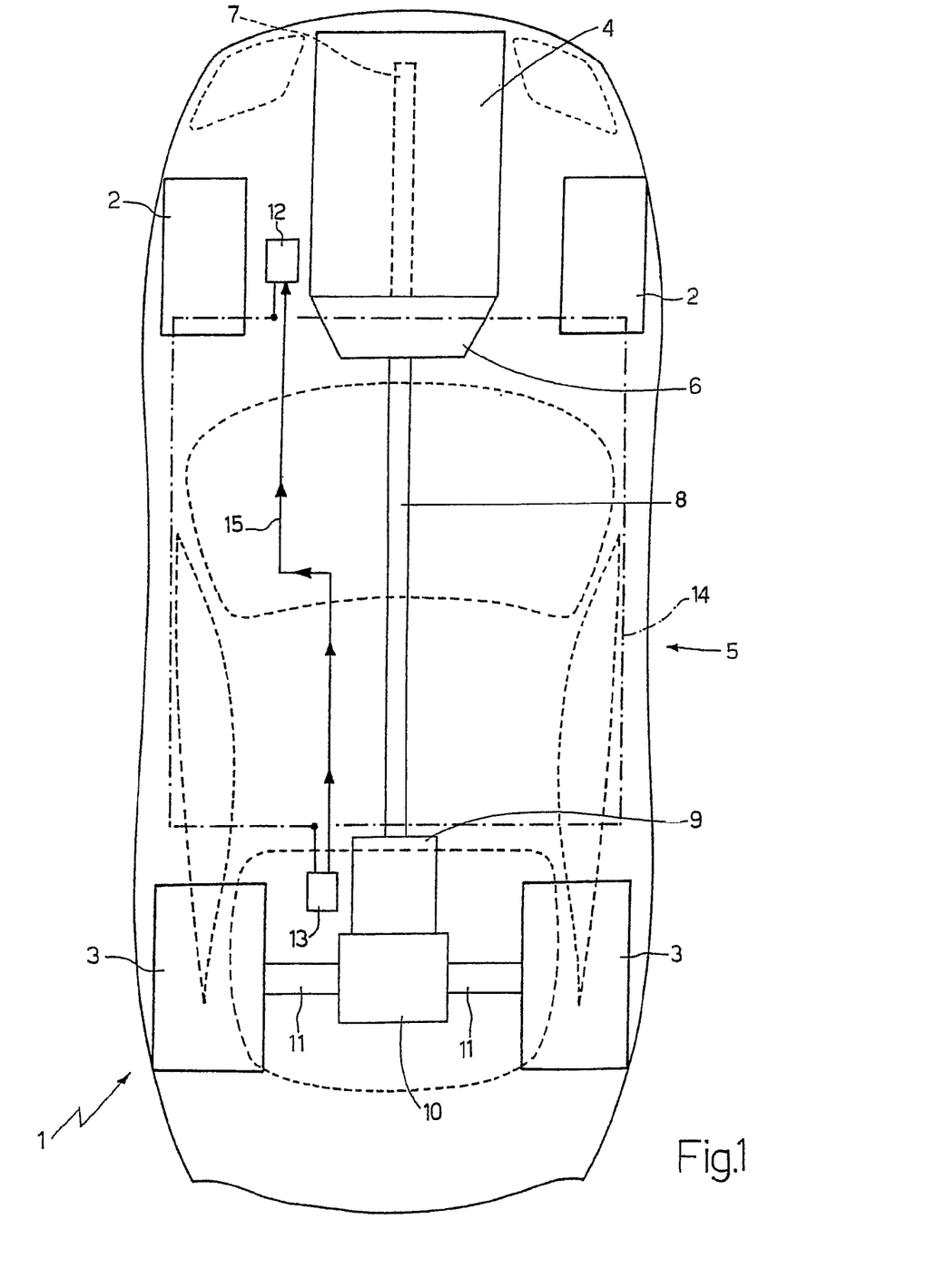
FIG. 1 is a schematic plan view of a rear wheel drive motorcar provided with servo-controlled gearbox operating according to the method of the present invention.

In FIG. 1, number 1 indicates a motor vehicle provided with two front wheels 2 and two rear drive wheels 3; an internal combustion engine 4, which produces a motive torque which is transmitted to rear drive wheels 3 by means of a transmission 5, is arranged in frontal position. Transmission 5 comprises a servo-assisted clutch 6, which is connected to a bell integral with engine 4 and adapted to connect crankshaft 7 of engine 4 to a propeller shaft 8 ending in a servo-assisted gearbox 9 arranged on the rear axle. A self-locking differential 10 is arranged in cascade to servo-assisted gearbox 9, from which differential a pair of drive axles 11 depart, each of which is integral with a rear drive wheel 3. Motor vehicle 1 comprises a control unit 12 of engine 4, a control unit 13 of transmission 5, and a BUS line 14, which is implemented according to the CAN (Car Area Network) protocol and spanned throughout the entire motor vehicle 1.

Figure 2:
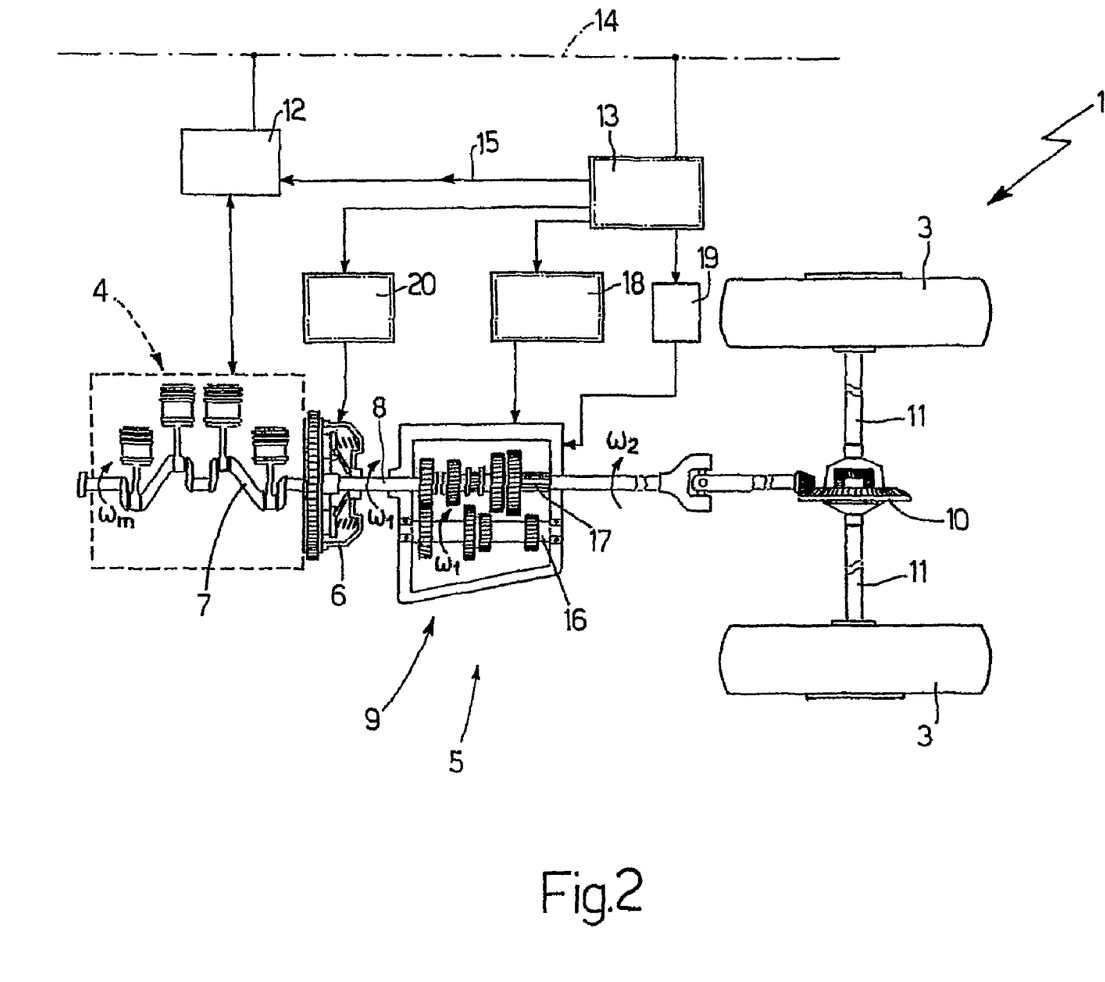
FIG. 2 is a schematic view of the engine and the servo-controlled gearbox of the motorcar in FIG. 1.

Both control unit 12 of engine 4, and control unit 13 of transmission 5 are connected to BUS line 14 and may therefore communicate with each other by means of messages sent over the BUS line 14 itself. Furthermore, control unit 12 of engine 4 and control unit 13 of transmission 5 are directly connected to each other by means of a dedicated electrical synchronisation wire 15, which is capable of directly transmitting a binary type signal without the delays introduced by BUS line 14 from control unit 13 of transmission 5 to control unit 12 of engine 4. As shown in FIG. 2, servo-assisted gearbox 9 comprises a primary shaft 16, which revolves at an angular velocity $\omega_1$, and a secondary shaft 17, which revolves at an angular velocity $\omega_2$ and transmits motion to the rear drive wheels 3 by means of differential 10 and the pair of drive axles 11. Servo-assisted gearbox 9 is operated by a gear engagement/disengagement servo-control 18 and by a gear selection servo-control 19; servo-control 18 and servo-control 19 may be either of the electrical type or of the hydraulic type and are driven by control unit 13 of transmission 5.

By interposition of servo-assisted clutch 6, primary shaft 16 is connected to crankshaft 7, which is brought into rotation by engine 4 and rotates at an angular velocity $\omega_m$. Servo-assisted clutch 6 is actuated by a servo-control 20, which is preferably of the hydraulic type and is driven by control unit 13 of transmission 5.

In the event of manual control of the transmission, the driver of motor vehicle 1 will send the gear shift command to control unit 13 of transmission 5 in a known way. When shifting from a current gear A to a next gear B, control unit 13 controls the performance of a series of operations in sequence, each of which must be completed before the next operation can be completed. Generally, the series of operations to be performed to shift from a current gear A to a next gear B comprises:

- cutting off motive torque output by engine 4;
- opening servo-assisted clutch 6 by driving servo-control 20;
- disengaging current gear A by driving servo-control 18;
- selecting next gear B by driving servo-control 19;
- engaging next gear B by driving servo-control 18;
- closing servo-assisted clutch 6 by driving servo-control 20; and
- restoring motive torque output by engine 4.

At the beginning of the gear shift and when servo-assisted clutch 6 is opened, the motive torque output by engine 4 must be essentially cancelled out to avoid a rapid, uncontrolled increase of angular velocity (m of crankshaft 7; in other words, during gear shift operations, the motive torque generated by engine 4 is controlled to maintain the angular velocity ° m of engine 7 equal to required values.

At the end of the gear shift and when servo-assisted clutch 6 is closed, the motive torque output by engine 4 must be restored to the same value assumed immediately before the gear shift, so as to avoid discontinuities which tend to generate abrupt longitudinal accelerations/decelerations.

Servo-controls 18, 19 and 20 are directly driven by control unit 13 of transmission 5; instead, motive torque variations output by engine 4 are made by control unit 12 of engine 4 following a specific request from control unit 13 of transmission 5. In particular, control unit 13 of transmission 5 asks control unit 12 of engine 4 to vary the motive torque during gear shifts by means of dedicated electrical synchronisation wire 15, which directly connects control unit 13 of transmission 5 to control unit 12 of engine 4 without the delays introduced by BUS line 14.

Figure 3:
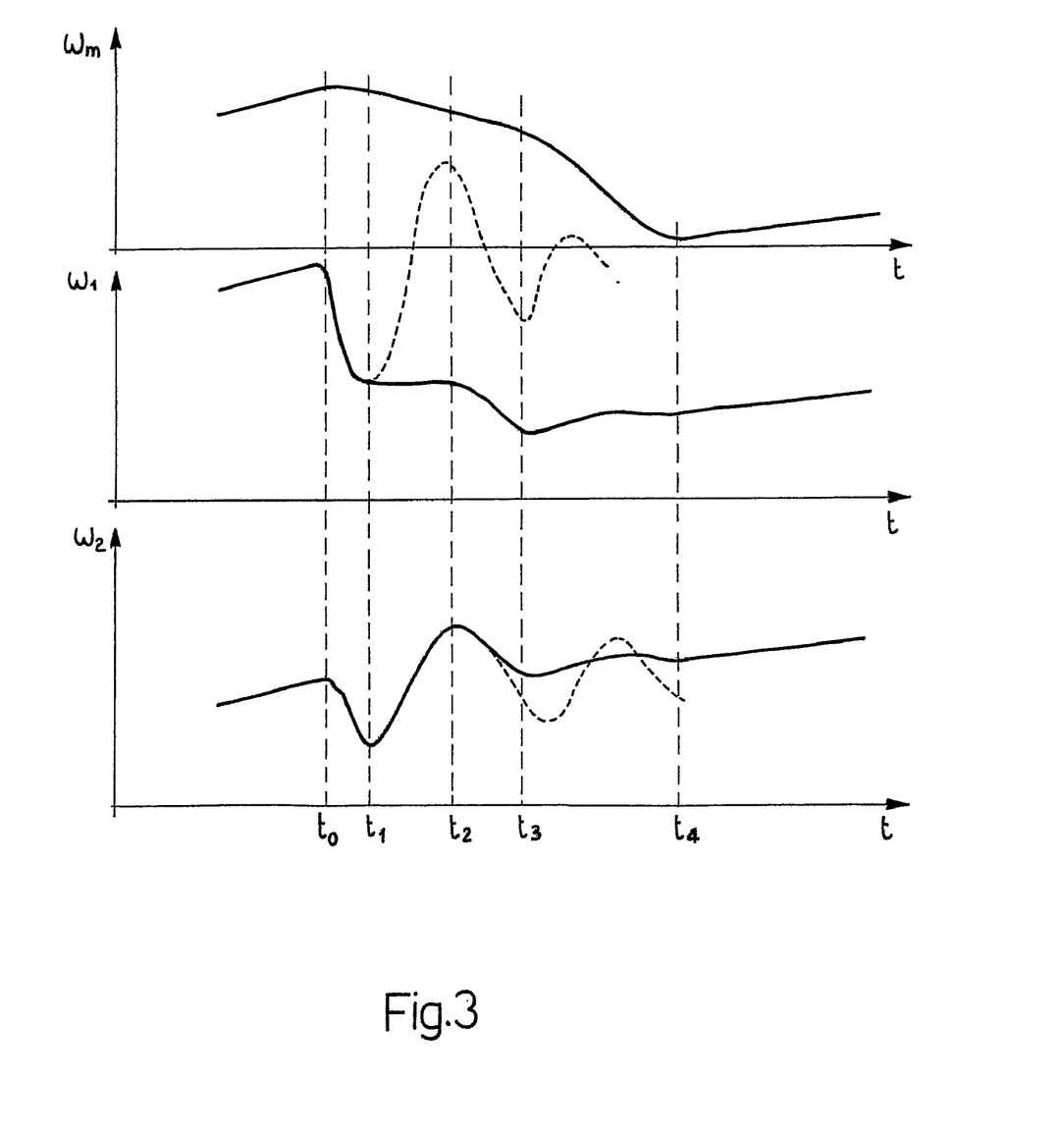
FIG. 3 shows the evolution in time of the angular revolution velocity of an engine crankshaft, of a primary gearbox shaft and of a secondary gearbox shaft during gear shifts.

With particular reference to the time graphs in FIG. 3, the operations required to shift from current gear A to next higher gear B (i.e. presenting a longer transmission ratio $\tau_B$) are described below; in particular, FIG. 3 shows the time evolution of angular velocity $\omega_m$ of crankshaft 7, the time evolution of angular velocity $\omega_1$ of primary shaft 16 and the time evolution of angular velocity $\omega_2$ of secondary shaft 17. Gear A presents a transmission ratio $\tau_A$, while new gear B presents a higher transmission ratio $\tau_B$ with respect to transmission ratio $\tau_A$ of gear A.

Before the gear shift, when gear A is still engaged, primary shaft 16 presents an angular velocity $\omega_1$ equal to angular velocity $\omega_m$ of crankshaft 7, while secondary shaft 17 presents an angular velocity $\omega_2$ directly dependent on angular velocity $\omega_1$ of primary shaft 16 by means of transmission ratio $\tau_A$ of gear A. Before the gear shift, when gear A is still engaged, angular velocity $\omega_m$ of crankshaft 7 (and therefore necessarily also angular velocities $\omega_1$ and $\omega_2$ of primary and secondary shafts 16 and 17) increases because motor vehicle 1 is accelerating.

As shown in FIG. 3, the gear shift starts at an instant $t_0$ in which an oscillation on angular velocities $\omega_1$ and $\omega_2$ of primary and secondary shafts 16 and 17 is generated before disengaging current gear A. The oscillation on angular velocities $\omega_1$ and $\omega_2$ of primary and secondary shafts 16 and 17 is generated by imposing an abrupt variation, i.e. a step variation, between the torque transmitted by clutch 6 and the torque load applied to rear drive wheels 3; in particular, such variation is considered abrupt if it occurs in a time shorter than the duration of the first fourth of the natural oscillation frequency of the kinematic system to which primary shaft 16 belongs.

It is important to observe that the whole of primary and secondary shafts 16 and 17 of gearbox 9, differential 10, drive axles 11, and rear drive wheels 3 forms a kinematic system, which is provided with its own inertial mass and its own torsional elasticity (due to the whole of all component deformations in the kinematic system) which is loaded by a torque value equal to the motive torque generated by engine 4 when motion is transmitted from engine 4 to rear drive wheels 3. Obviously, the motive torque generated by engine 4 and transmitted by engine 4 to rear wheels 3 is contrasted by a torque load applied to rear drive wheels 3.

The higher the variation velocity between torque transmitted by clutch 6 and torque load applied to rear drive wheels 3, the higher the amplitude of the oscillation trigged by angular velocities $\omega_1$ and $\omega_2$ of primary and secondary shafts 16 and 17; thus, by adjusting the velocity of such variation, it is possible to adjust the amplitude of such variation.

The abrupt variation between the torque transmitted by clutch 6 and the torque load applied to rear drive wheels 3, i.e. the oscillation on angular velocities $\omega_1$ and $\omega_2$ of primary and secondary shafts 16 and 17, may be generated either by abruptly opening clutch 6 and/or by abruptly stalling engine 4.

An abrupt opening of clutch 6 is obtained by actuating clutch 6 itself by a step command; i.e. clutch 6 is passed from closed state to open state in the shortest possible time interval compatibly with the physical limits required by the concerned mechanics. An abrupt stalling of engine 4 (i.e. a sudden cancelling out of motive torque generated by engine 4) is obtained by suddenly and instantaneously cutting off fuel injection to the cylinders of engine 4; it is important to underline that the instantaneous and temporary stalling of engine 4 only produces an oscillation on angular velocities $\omega_1$ and $\omega_2$ of primary and secondary shafts 16 and 17 if clutch 6 is still closed.

Both the abrupt opening of clutch 6, and the abrupt stalling of engine 4 determine a nearly instantaneously cancelling out of torque applied to primary shaft 16 and, by effect of the energy stored in the kinematic system elasticity, trigger oscillations of high inertia entity (up to 30-40% of the current values of angular velocities $\omega_1$ and $\omega_2$) which tend to be damped out according to an exponential type law, on angular velocities $\omega_1$ and $\omega_2$ of primary and secondary shafts 16 and 17. In FIG. 3, the dotted line shows how the oscillations on angular velocities $\omega_1$ and $\omega_2$ of primary and secondary shafts 16 and 17 would evolve in time if other factors detailed below did not intervene to stop the natural development of the oscillations themselves. It is important to observe that the oscillation is always triggered with a reduction of angular velocities $\omega_1$ and $\omega_2$, because of the lack of the motive torque which generated system revolution; in other words, the first oscillation half-wave is always negative, i.e. tends to reduce angular speeds $\omega_1$ and $\omega_2$ with respect to the values of instant $t_0$.

The disengagement of gear A, i.e. the separation between primary shaft 16 and secondary shaft 17, is performed at instant $t_1$ when the oscillation has taken angular velocity $\omega_1$ of primary shaft 16 to be close to the angular velocity $\omega_1$ that the primary shaft 16 itself must assume in order to engage next gear B. In this way, at the end of gear A disengagement, angular velocity $\omega_1$ of primary shaft 16 is already close to the angular velocity $\omega_1$ that the primary shaft 16 itself must assume to engage gear B. In particular, in order to maximise the positive effect of reducing angular velocity $\omega_1$ of primary shaft 16, gear A is disengaged about the maximum amplitude of an oscillation half-wave, and in particular about the maximum amplitude of the first oscillation half-wave. By disengaging gear A about the maximum amplitude of the first oscillation half-wave, moreover, the oscillation on angular velocity $\omega_1$ of primary shaft 16 is stopped as soon as it arises.

Subsequently, gear B is engaged at instant $t_2$ when the oscillation has taken angular velocity $\omega_2$ of secondary shaft 17 to be either equal to or essentially equal to current angular velocity $\omega_1$ of primary shaft 16 multiplied by transmission ratio $\tau_B$ of gear B. After engaging gear B, primary shaft 16 and primary shaft 17 are reciprocally and rigidly connected and angular velocity $\omega_1$ of primary shaft 16 presents the same instantaneous trend as angular velocity $\omega_2$ of secondary shaft 17.

After engaging gear B, the oscillation triggered on secondary shaft 17 rapidly takes angular velocities $\omega_1$ and $\omega_2$ of primary and secondary shafts 16 and 17 to the value required by the current speed of car 1 which is reached at instant $t_3$; at this point, i.e. at instant $t_3$ in which angular velocities $\omega_1$ and $\omega_2$ of primary and secondary shafts 16 and 17 equalise the value required by the current speed of car 1, clutch 6 is closed again to make primary shaft 16 integral to crankshaft 7 again. Alternatively, to further reduce the gear shifting time, clutch 6 may be closed in advance also if angular velocities $\omega_1$ and $\omega_2$ of primary and secondary shafts 16 and 17 have not reached the value determined by the current speed of car 1.

During the closing step of clutch 6 after engaging gear B, angular velocity $\omega_m$ of crankshaft 7 is taken to equalise angular velocity $\omega_1$ of primary shaft 16, which angular velocity $\omega_1$ is required by the speed of car 1, because primary shaft 16 is angularly integral with rear drive wheels 3 through drive axles 11, differential 10, secondary shaft 17, and the gears of gear B.

The closing of clutch 6 to mechanically connect primary shaft 16 to crankshaft 7 starts at instant $t_3$ and ends at instant $t_4$. It is important to observe that essentially already soon after instant $t_3$, clutch 6 transmits motive torque from crankshaft 7 to primary shaft 16, and therefore to rear drive wheels 3; consequently, traction to rear drive wheels 3 is returned already soon after instant $t_3$ and therefore, from a point of view of dynamics of car 1, the gear shift ends soon after instant $t_3$ also if clutch 6 is still slipping.

According to the above-described embodiment, the opening of clutch 6 is provided to separate primary shaft 16 from crankshaft 7; however, according to an alternative embodiment, gear shifts are performed without opening the clutch 6 (i.e. by always maintaining primary shaft 16 fastened to crankshaft 7) and by generating the abrupt variation between torque transmitted by clutch 6 and torque load applied to the rear drive wheels 3, i.e. by generating the oscillation on angular velocities $\omega_1$ and $\omega_2$ of primary and secondary shafts 16 and 17, only by abruptly stalling engine 4.

According to a possible embodiment, the speed variation between the torque transmitted by clutch 6 and the load torque applied to rear drive wheels 3 may be adjusted to vary the maximum amplitude of the oscillations triggered on angular velocity $\omega_1$ of primary shaft 16 according to the deviation between angular velocity $\omega_1$ of primary shaft 16 immediately before the gear shift and angular velocity $\omega_1$ of primary shaft 16 immediately after the gear shift.

From the above, it is apparent that in order to synchronise new gear B, i.e. to adapt angular velocity $\omega_1$ of primary shaft 16 to the angular velocity determined by gear B, the oscillation trigged on both primary shaft 16 and secondary shaft 17 is exploited, instead of the synchronisers of gearbox 9. In particular, the oscillation triggered on primary shaft 16 is used to obtain a rapid decrease of angular velocity $\omega_1$ of primary shaft 16 and then the oscillation triggered on secondary shaft 17 is used to obtain a rapid and temporary increase of angular velocity $\omega_2$ of secondary shaft 17 so that the angular velocity $\omega_2$ of secondary shaft 17 equalises the current angular velocity $\omega_1$ of primary shaft 16 multiplied by transmission ratio $\tau_B$ of gear B in order to engage gear B; finally, after engaging gear B, the oscillation triggered on secondary shaft 17 is used to take angular velocities $\omega_1$ and $\omega_2$ of primary and secondary shafts 16 and 17 to the value required by the current speed of car 1.

The above-described methods for shifting from gear A to higher gear B allow to shift gear in a very short time because the synchronisers of gearbox 9 are not employed and the synchronisation time of new gear B to adapt angular velocity $\omega_1$ of primary shaft 16 to angular velocity required by gear B is extremely short.

The above-described methods for shifting from gear A to gear B may be similarly applied also if gear B is lower than gear A; the only difference is that, after the gear shift, primary shaft 16 must have an angular velocity $\omega_1$ higher, and not lower, than the situation before the gear shift. Consequently, the oscillation triggered on angular velocities $\omega_1$ and $\omega_2$ of primary and secondary shafts 16 and 17 must be used to accelerate, and not decelerate, primary shaft 16.

According to a preferred embodiment, control unit 13 of transmission 5 normally sends a low logical state through dedicated electrical synchronisation wire 15 and sends a high logical state when the motive torque generated by engine 4 is to be cut off during gear shifts. In other words, when control unit 12 of engine 4 receives a low logical level through dedicated electrical synchronisation wire 15, then control unit 12 of engine 4 works normally, actuating a motive torque essentially determined according to the commands of the driver; instead, when control unit 12 of engine 4 receives a high logical level through dedicated electrical synchronisation wire 15, then control unit 12 of engine 4 cuts off motive torque and maintains motive torque at essentially zero values until it receives a high logical level through dedicated electrical synchronisation wire 15.

Preferably, control unit 13 of transmission 5 sends redundant controls to control unit 12 of engine 4, so that control unit 12 of engine 4 may monitor the existence of a continuous consistency among received commands; in the event of lack of consistency among received commands, then a fault condition is diagnosed and an emergency operation procedure is activated. In particular, the transmission of a motive torque variation command from control unit 13 of transmission 5 to control unit 12 of engine 5 requires control unit 13 of transmission 5 to be sending the motive torque variation command to control unit 12 of engine 5 by means of dedicated electrical synchronisation wire 15 and at the same time control unit 13 of transmission 5 to be sending the same command along with a confirmation message forwarded by the BUS line 14 to control unit 12 of engine 5. Control unit 12 of engine 5 actuates the received motive torque variation command by means of dedicated electrical synchronisation wire 15 immediately after receiving the command itself, and control unit 12 of engine 4 suspends actuation of the motive torque variation command if the confirmation message is not received by the BUS line 14 within a certain interval of time. In the event of discrepancy between the commands received by means of dedicated electrical synchronisation wire 15 and the commands received by means of BUS line 14, a fault condition of dedicated electrical synchronisation wire 15 is diagnosed and consequently only the commands sent by means of BUS line 14 are actuated.

According to a preferred embodiment, in order to cut off motive torque output by engine 4 during a gear shift, control unit 12 of engine 5 only controls the injectors to prevent fuel injection without modifying the throttle position of engine 4. Such control method allows to rapidly cut off motive torque and subsequently restore motive torque in an equally rapid way: indeed, it is important to underline that the driving of the throttle of engine 4 requires the movement of mechanical parts having a relatively high mechanical inertia, while the control of the injectors is performed within a very rapid time.

During the design and tuning step of servo-actuated transmission 5, an estimated delay time DT is determined and stored in a memory (not shown) of control unit 13 of transmission 5 for each gear shift operation to be performed. The estimated delay time DT for an operation corresponds to the time interval elapsing from the instant in which the actuation of the operation is commanded and the instant in which the operation itself is actually completed.

According to a preferred embodiment, each estimated delay time DT is checked and corrected, if necessary, for each gear shift operation; in other words, at each gear shift operation, the actual value of each estimated delay time DT is determined and if the stored estimated delay time DT is significantly different from the measured delay time DT then the stored estimated delay time DT is corrected by using the measured delay time DT. If the stored estimated delay time DT is significantly different from the measured delay time DT, then the new stored estimated delay time DT is calculated as the (possibly weighed) average between the previously stored estimated delay time DT and the measured delay time DT.

According to a possible embodiment, each envisaged delay time DT could be expressed according to the actual working temperature, i.e. according to the temperature of a cooling liquid of engine 4.

As mentioned above, in order to shift from a current gear to a next gear, a series of operations are performed in sequence, each of which must be completed before the next operation can be completed. With particular reference to the time diagram shown in FIG. 4, control unit 13 of transmission 5 commands the actuation of a first operation (OPERATION I) at an instant of time $t_1$; subsequently, control unit 13 of transmission 5 estimates an instant of time $t_2$ in which the first operation will be actually completed, by adding the estimated delay time DT for the first operation to instant of time $t_1$ in which actuation of the first operation was commanded. At this point, control unit 13 of transmission 5 determines an instant of time $t_3$ in which to command actuation of a next second operation (OPERATION II) by subtracting the estimated delay time DT for the second operation decreased by a safety constant SC, whose function is to avoid overlapping between the actual instant of actuation of the first operation and the instant of actual actuation of the second operation, from instant of time $t_2$.

Figure 4:
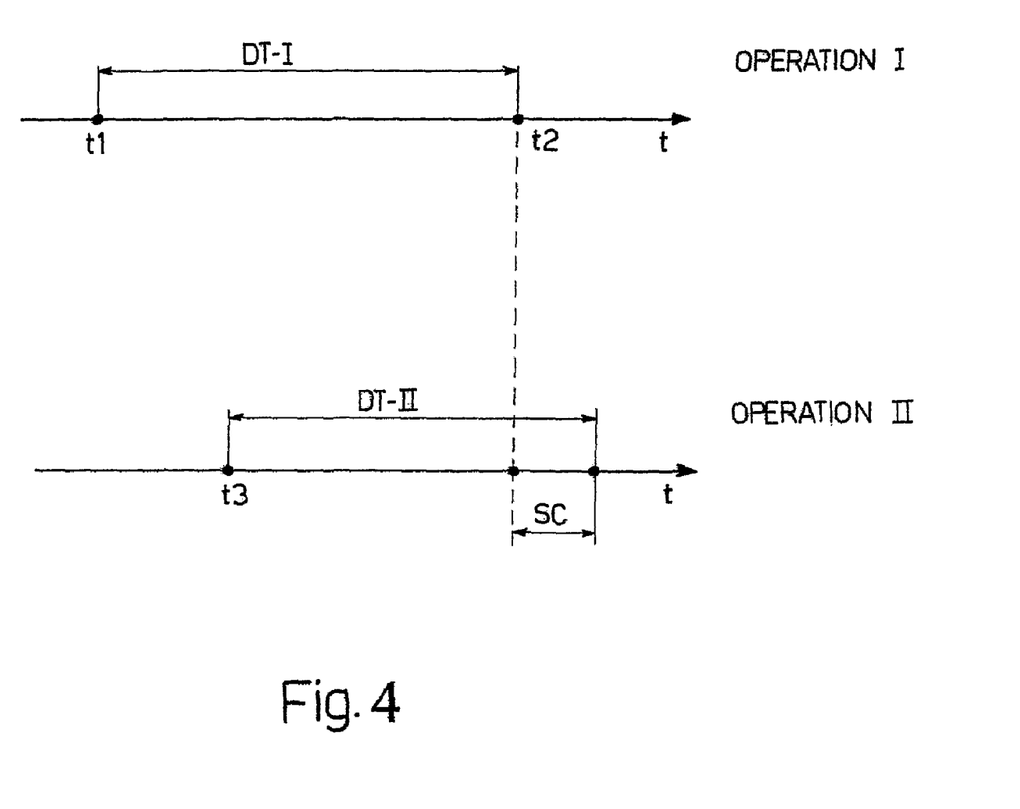
FIG. 4 schematically shows the time sequence of the actuation of two operations performed by the manual gearbox in FIG. 2 during gear shifts.

The above-described control method is applied to all operations which must be performed in sequence to shift a gear; in this way, an interval of time equal to safety constant SC elapses between the instant of time in which an operation is actually completed and the instant of time in which the next operation is actually completed.

According to the above, it is apparent that a previous operation is completed before the next operation is completed, but the actuation of a previous operation may be simultaneous or at least partially simultaneous to the actuation of the next operation. In other words, a previous operation is performed at the same time or nearly at the same time as a next operation, notwithstanding that the previous operation must be completed before completion of the next operation.

When control unit 13 of transmission 5 receives the gear shift command, control unit 13 of transmission 5 immediately asks control unit 12 of engine 4 to cut off motive torque; at this point, control unit 13 of transmission 5 defines the instant of time in which the motive torque cut-off operation will be actually completed and therefore determines the instant of time in which to command the opening operation of servo-assisted clutch 6 so that the opening operation of servo-assisted clutch 6 is actually completed immediately after (i.e. after a time interval equal to safety constant SC) the actual completion of the motive torque cut-off operation.

By using the instant of time in which the servo-assisted clutch 6 opening operation will actually be completed, control unit 13 of transmission 5 determines the instant of time in which to command actuation of the current gear disengagement operation so that the current gear disengagement operation is actually completed immediately after (i.e. after a time interval equal to safety constant SC) the actual completion of the servo-assisted clutch 6 opening operation.

By using the instant of time in which the current gear disengagement operation will actually be completed, control unit 13 of transmission 5 determines the instant of time in which to command actuation of the next gear selection operation so that the next gear selection operation is actually completed immediately after (i.e. after a time interval equal to safety constant SC) the actual completion of the current gear disengagement operation.

By using the instant of time in which the next gear selection operation will actually be completed, control unit 13 of transmission 5 determines the instant of time in which to command actuation of the next gear engagement operation so that the next gear engagement operation is actually completed immediately after (i.e. after a time interval equal to safety constant SC) the actual completion of the next gear selection operation.

By using the instant of time in which the next gear engagement operation will actually be completed, control unit 13 of transmission 5 determines the instant of time in which to command actuation of the servo-assisted clutch 6 closing operation so that the servo-assisted clutch 6 closing operation is actually completed immediately after (i.e. after a time interval equal to safety constant SC) the actual completion of the next gear engagement operation.

By using the instant of time in which the servo-assisted clutch 6 closing operation is actually completed, control unit 13 of transmission 5 determines the instant of time in which to command actuation of the operation of restoring motive torque output by engine 4 so that the motive torque restoring operation is actually completed immediately after (i.e. after a time interval equal to safety constant SC) the actual completion of the servo-assisted clutch 6 closing operation.

According to a preferred embodiment, the value of safety constant SC depends on a driving style selected by the driver of motorcar 1; in particular, the sportier the selected driving style, the lower the value of the safety constant (at most, the value of safety constant SC could be cancelled out in the event of competitive track racing).

Furthermore, preferably, each operation is associated to its own safety constant SC, potentially different from the other safety constants SC; in particular, the higher the safety constant SC of an operation, the lower the accuracy with which the delay time DT of the previous operation is calculated.

In the known servo-assisted transmission, before commanding the actuation of an operation, it is necessary to wait for verification of the completion of the previous operation actuation; such verification is provided by specific sensors which determine the state (position and/or speed of revolution) of the servo-assisted components of transmission 5. However, by operating in this way, inevitable delays related to the time needed to verify the completion of various operations are introduced. Instead, according to the above-described method, no verification of the completion of the previous operation actuation is performed before commanding the actuation of a next operation, but thanks to the use of estimated delay times DT, an operation is actually completed immediately after (i.e. after a time interval equal to safety constant SC) the actual completion of the previous operation. The various sensors which determine the state (position and/or revolution speed) of the components of servo-assisted transmission 5 are no longer used to authorise the actuation of the various operations, but are only used to determine the actual value of each estimated delay time DT so as to determine (as previous described) the correctness of the stored estimated delay times DT with a hindsight.

The invention claimed is:

1. A method of gear shifting in a servo-controlled gearbox for shifting from a first current gear to a second next gear, the gearbox including at least one primary shaft connected to a crankshaft of an engine by a clutch and a secondary shaft connected to drive wheels, the method comprising:
   generating an oscillation on angular velocities of the primary and secondary shafts before disengaging the first current gear;
   separating the primary shaft from the secondary shaft thus disengaging the first current gear when the oscillation of the angular velocity of the primary shaft has taken the angular velocity of the primary shaft close to the angular velocity that the primary shaft must assume to engage the second next gear;
   connecting the primary shaft to the secondary shaft thus engaging the second next gear;
   connecting the primary shaft to the secondary shaft thus engaging the second next gear when the oscillation of the angular velocity of the secondary shaft has led the angular velocity of the secondary shaft to equalize the current angular velocity of the primary shaft multiplied by the transmission ratio of the second next gear;
   calculating for each operation an estimated delay time corresponding to the time interval elapsing from the instant in which the actuation of the operation is commanded and the instant in which the operation itself is actually completed;
   commanding the actuation of a first operation at a first instant of time;
   calculating a second instant of time in which the first operation will be actually completed, adding the delay time estimated for the first operation itself to the first instant of time in which actuation of the first operation was commanded;
   determining a third instant of time in which to command the actuation of the second next operation subtracting the delay time estimated for the second operation decreased by a safety constant, whose function is to avoid overlapping between the completion of the first operation and the completion of the second next operation, from the second instant of time; and
   commanding the actuation of the second next operation when the third instant of time is reached.

2. A method according to claim 1, wherein before separating the primary shaft from the secondary shaft thus disengaging the first current gear, the clutch is opened to separate the primary shaft from the crankshaft; and after having connected the primary shaft to the secondary shaft thus engaging the second next gear, the clutch is closed to connect the primary shaft to the crankshaft.

3. A method according to claim 2, wherein the clutch is closed to connect the primary shaft to the crankshaft when the oscillation takes the angular velocities of the primary and secondary shafts to equalize the value determined by the current speed of the drive wheels.

4. A method according to claim 2, wherein the clutch is closed to connect the primary shaft to the crankshaft before the angular velocities of the primary and secondary shafts reach a value required by the current speed of the drive wheels.

5. A method according to claim 1, wherein while shifting from the first current gear to the second next gear, the clutch is kept closed and therefore the primary shaft is always mechanically secured to the crankshaft.

6. A method according to claim 1, wherein the oscillation on the angular velocities of the primary and secondary shafts is generated by imposing an abrupt variation between torque transmitted by the clutch and torque load applied to the drive wheels.

7. A method according to claim 6, wherein the variation between torque transmitted by the clutch and the load torque applied to the drive wheels occurs in a time less than duration of the first wave quarter of the natural oscillation frequency of the mechanical system to which the primary shaft belongs.

8. A method according to claim 6, wherein the oscillation on angular speeds of the primary and secondary shafts is generated by an abrupt opening of the clutch.

9. A method according to claim 8, wherein the clutch is opened according to a step law.

10. A method according to claim 6, wherein the oscillation on angular speeds of the primary and secondary shafts is generated by an abrupt cut-off of motive torque transmitted by the crankshaft.

11. A method according to claim 10, wherein the sudden cut-off of motive torque transmitted by the crankshaft is obtained by suddenly stalling the engine when the clutch is closed, and therefore the primary shaft is mechanically connected to the crankshaft.

12. A method according to claim 11, wherein the engine is abruptly stalled by cutting off fuel injection in the cylinders of the engine itself.

13. A method according to claim 1, wherein the amplitude of the oscillation on the angular velocities of the primary and secondary shafts is regulated according to the difference existing between the angular velocity of the primary shaft immediately before the gear shift and the angular velocity of the primary shaft immediately after the gear shift.

14. A method according to claim 1, wherein the first current gear is disengaged about a maximum amplitude of the first oscillation half-wave.

15. A method according to claim 1, wherein each estimated delay time is initially stored during a design and tuning, and later checked and, if required, corrected at each gear shift operation.

16. A method according to claim 15, wherein the actual value of each estimated delay time is determined, and if the stored estimated delay time is significantly different from the measured delay time, then the stored estimated delay time is corrected using the measured delay time at each gear shift operation.

17. A method according to claim 16, wherein if the stored estimated delay time is significantly different from the measured delay time, then the new stored estimated delay time is calculated as the average between the previous stored estimated delay time and the measured delay time.

18. A method according to claim 15, wherein each estimated delay time is expressed according to the actual working temperature.

19. A method according to claim 15, wherein the value of the safety constant depends on a selected driving style; the sportier the selected driving style, the lower the value of the safety constant.

20. A method according to claim 15, wherein each operation is associated to its own safety constant potentially different from the other safety constants.

21. A method according to claim 15, wherein the series of operations to be performed to shift a gear further comprises reduction of motive torque output by an engine at the beginning of the gear shift and the increase of motive torque output by the engine at the end of the gear shift; and a control unit of the transmission requests a control unit of the engine to vary the motive torque during the gear shift by a dedicated electrical synchronization wire, which directly connects the control unit of the transmission to the control unit of the engine.

22. A method according to claim 21, wherein the control unit of the transmission normally sends a low logical state through a dedicated electrical synchronization wire and sends a high logical state when the motive torque generated by the engine is to be cut off during a gear shift.

23. A method according to claim 21, wherein the sending of a motive torque variation command of the control unit of the transmission to the control unit of the engine provides for:
- the control unit of the transmission to send the command to vary the motive torque to the control unit of the engine by the dedicated electrical synchronization wire;
- at the same time the control unit of the transmission to send the same command along with a confirmation message forwarded by a BUS line to the control unit of the engine;
- the control unit of the engine to actuate the motive torque variation command received on the dedicated electrical synchronisation wire immediately after receiving the command itself; and
- the control unit of the engine to suspend actuation of the motive torque command if the confirmation message is not received by the BUS line within a determined time interval.

24. A method according to claim 23, wherein, in event of discrepancy between the commands received by the dedicated electrical synchronisation wire and the commands received by the BUS line, a fault condition of the dedicated electrical synchronization wire is diagnosed and consequently only the commands sent by the BUS line are actuated.

* * * * *